(12) United States Patent
Chen et al.

(10) Patent No.: US 9,913,096 B1
(45) Date of Patent: Mar. 6, 2018

(54) SMART COMMUNICATION SYSTEM WITH ADAPTIVE ANTENNA BEAM-FORMING FOR LINK OF DATA TRANSMISSION DEVICE TO USER DEVICE, AND ASSOCIATED BEAM-FORMING METHOD THEREFOR

(71) Applicant: NATIONAL CHUNG SHAN INSTITUTE OF SCIENCE AND TECHNOLOGY, Taoyuan (TW)

(72) Inventors: Nan-Wei Chen, Taoyuan (TW); Hsi-Hsir Chou, Taoyuan (TW); Yao-Chiang Kan, Taoyuan (TW); Dun-Yuan Cheng, Taoyuan (TW); Chien-Te Yu, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 0 days.

(21) Appl. No.: 15/374,405

(22) Filed: Dec. 9, 2016

(51) Int. Cl.
| | |
|---|---|
| H04W 64/00 | (2009.01) |
| H04W 4/02 | (2018.01) |
| H01Q 1/24 | (2006.01) |
| H04W 16/28 | (2009.01) |
| H04L 29/08 | (2006.01) |
| H01Q 21/00 | (2006.01) |
| H04W 4/00 | (2018.01) |

(52) U.S. Cl.
CPC ............ *H04W 4/025* (2013.01); *H01Q 1/243* (2013.01); *H01Q 21/00* (2013.01); *H04L 67/02* (2013.01); *H04W 16/28* (2013.01); *H04W 4/008* (2013.01)

(58) Field of Classification Search
CPC ... H04B 7/0617; H04B 17/318; H04W 16/28; H04W 16/24
USPC ........... 455/13.1, 452.1, 456.1, 456.2, 562.1; 342/352, 425
See application file for complete search history.

(56) References Cited

U.S. PATENT DOCUMENTS

| | | | |
|---|---|---|---|
| 2002/0034967 A1* | 3/2002 | Taniguchi | H04W 16/28 455/562.1 |
| 2014/0308976 A1 | 10/2014 | Garin et al. | |
| 2016/0274215 A1 | 9/2016 | Edge et al. | |

OTHER PUBLICATIONS

Dun-Yuan Cheng et al., Real-Time Optimization of WiFi RF Signal Distribution in the Coverage of Smart Antenna System via the Cloud Database Computation, published Jul. 26-29, 2016 at APCAP(Asia-Pacific Conference on Antennas and Propagation).

* cited by examiner

*Primary Examiner* — Sam Bhattacharya
(74) *Attorney, Agent, or Firm* — WPAT, PC (57) ABSTRACT

A smart communication system, for adaptive antenna beam-forming for a link of a data transmission device to at least a user device, is introduced. The system comprises a plurality of positioning devices, a data transmission device, and a cloud server. The positioning devices send a plurality of positioning signals to the at least a user device to effectuate positioning. The data transmission device is for use with adaptive antenna beam-forming to provide wireless communication. The user device communicates with the cloud server through the base station unit. The cloud server receives positioning information of the at least a user device, generates a control signal for beam-forming in accordance with the positioning information, and sends the control signal to the data transmission device. The data transmission device controls the beam-forming of the data transmission device in accordance with the control signal.

8 Claims, 10 Drawing Sheets

| Cell phone ID | Time | WiFi_db | B1_db | B2_db | B3_db | max_becon |
|---|---|---|---|---|---|---|
| htc938 | 05:12 | -50 | -60 | -70 | -75 | B1_db |
| htc938 | 05:13 | -50 | -70 | -60 | -75 | B2_db |
| htc938 | 05:14 | -50 | -70 | -60 | -55 | B3_db |
| htc938 | 05:15 | -50 | -60 | -60 | -55 | B3_db |
| htc938 | 05:16 | -40 | -60 | -45 | -70 | B2_db |
| htc938 | 05:17 | -50 | -78 | -80 | -67 | B3_db |

SMART COMMUNICATION SYSTEM WITH ADAPTIVE ANTENNA BEAM-FORMING FOR LINK OF DATA TRANSMISSION DEVICE TO USER DEVICE, AND ASSOCIATED BEAM-FORMING METHOD THEREFOR

FIELD OF THE INVENTION

The present invention relates to smart antenna systems and, more particularly, to a smart communication system with adaptive antenna beam-forming for a link of a data transmission device to a user device, and an associated beam-forming method therefor.

BACKGROUND OF THE INVENTION

Due to the increasingly wide use of portable devices which can be connected to the Internet, the bandwidth of conventional wireless transmission frequencies no longer meets user needs. To enhance the speed and performance of digital signal processing systems, beam-forming has become an important technique to the 5G mobile communication. In this regard, beam-forming is a technique related to digital signal processing and array antennas. Its operating principle lies in enabling an emitter to treat a user's position as a target signal and adjust it so that not only is a main beam aimed at the target signal by modulating the beam, but the signal is also tracked in real time. Therefore, beam-forming effectuates an adaptive smart antenna system.

The common means of adjusting the beam includes beam synthesis and beam shift, which involves adjusting the distance between an array antenna unit and an array antenna so that one of the circuits in use is a phase adjustment circuit passively fed into a network. The phase adjustment circuit passively fed into a network requires a passive network, such as a Butler matrix, which adjusts transmitted energy and phases, depending on whether to change impedance matching and the electrical length of a transmission line. However, take a microstrip planar Butler matrix as an example, it has plenty drawbacks, as described below. To increase the number of the required beams, the structural size of the microstrip planar Butler matrix has to increase, thereby adding to the difficulty in integrating the microstrip planar Butler matrix and an array antenna. Due to the way of arranging the transmission lines of the microstrip planar Butler matrix, energy in a circuit substrate is likely to keep attenuating. Therefore, the aforesaid passive network for effectuating phase shift and beam adjustment cannot be effectively applied to most circuits, not to mention that it is cost-ineffective because of excessive energy loss.

A conventional communication data transmission system relies upon the trigonometric positioning method to adjust a beam to a required position, using parameters obtained by the positioning method. But the method is restricted to positioning and directing the beam toward a specific positioning handheld device. Furthermore, variations in user habits lead to everlasting position changes. As a result, the communication data transmission system has to detect for a user's position at specific time intervals, and in consequence signal transmission ends up with a waiting time period known as "window period." To detect a user's position anew, the system spends much time waiting for a positioning process in the course of signal transmission, not to mention that beam adjustment does not begin until the detection process ends.

As a result, the aforesaid communication transmission system has low processing efficiency and therefore fails to meet user needs, thereby having much room for improvement.

SUMMARY OF THE INVENTION

It is an objective of the present invention to enhance the efficiency of adaptive antenna beam-forming for the link of a data transmission device to a user device.

In order to achieve the above and other objectives, the present invention provides a smart communication system for adaptive antenna beam-forming for a link of a data transmission device to at least a user device. The system comprises a plurality of positioning devices, a data transmission device, and a cloud server. The positioning devices send a plurality of positioning signals to at least a user device to effectuate positioning. The data transmission device is for use with adaptive antenna beam-forming to provide wireless communication. The user device communicates with the cloud server through the data transmission device. The cloud server receives positioning information of the at least a user device, generates a control signal for beam-forming in accordance with the positioning information, and sends the control signal to the data transmission device. The data transmission device controls the beam-forming of the data transmission device in accordance with the control signal.

In an embodiment of the present invention, the data transmission device comprises an array antenna and a control circuit. The array antenna has a plurality of antenna units. The control circuit is coupled to the antenna units to control the array antenna to adaptively form an antenna beam, wherein the control circuit controls the array antenna to adaptively form an antenna beam in accordance with the control signal.

In an embodiment of the present invention, the control circuit comprises a plurality of phase shifters coupled to the antenna units to control the antenna units to adaptively form an antenna beam.

In an embodiment of the present invention, the data transmission device comprises a network unit coupled to the control circuit to communicate with the cloud server and thereby receive the control signal.

In an embodiment of the present invention, the cloud server comprises a processing unit and a database. The database is coupled to the processing unit. The processing unit receives positioning information of the at least a user device, sends the positioning information of the at least a user device to the database, and determines the position of the at least a user device relative to positions of the positioning devices in accordance with the positioning information of the at least a user device, thereby generating a control signal for beam-forming.

In an embodiment of the present invention, the positioning information of the at least a user device at least comprises: signal strength of the positioning devices manifested thereby toward the user device and recorded by the user device after the user device has received the positioning signals, and signal strength related to a wireless communication link and provided by the data transmission device to the user device.

In an embodiment of the present invention, the positioning devices comprise Bluetooth-enabled devices or global satellite positioning devices.

In an embodiment of the present invention, the data transmission device provides at least one of wireless local area network communication, wireless mobile network communication, and wireless wide area network communication.

In order to achieve the above and other objectives, the present invention further provides an adaptive antenna beam-forming method for a link of a data transmission device to at least a user device, the method comprising the steps of: with a user device, generating and sending positioning information to a cloud server; receiving by the cloud server the positioning information from the user device; generating a beam-forming control signal by the cloud server in accordance with the positioning information from the at least a user device; sending the control signal to a data transmission device; and controlling the beam-forming of the data transmission device in accordance with the control signal.

Accordingly, the present invention improves the adaptive antenna beam-forming for a link of a data transmission device to a user device in terms of adjustment in the positioning of the user device and the beam-forming control performed over the position of the user device, using computation resources and network resources extrinsic to the data transmission device, so as to lessen the workload of the data transmission device and thereby solve the problems arising from a "window period." The present invention further optimizes the coverage rate for multiple users by weight matching and data construction of cloud computation.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
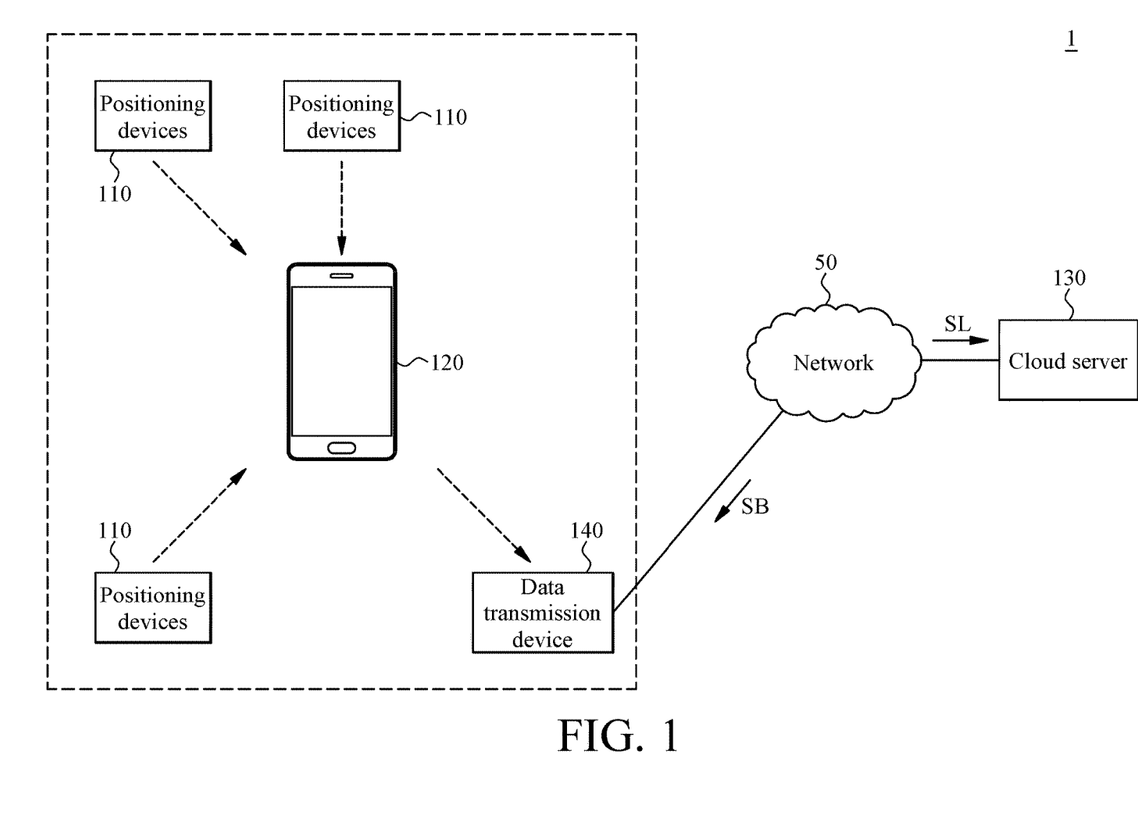
FIG. 1 is a block diagram of a smart communication system according to an embodiment of the present invention.

FIG. 1 is a block diagram of a smart communication system according to an embodiment of the present invention. As shown in FIG. 1, a smart communication system 10 is capable of adaptive antenna beam-forming for a link of a data transmission device 140 to at least a user device 120. The smart communication system 10 comprises a plurality of positioning devices 110, a data transmission device 140, and a cloud server 130. In the smart communication system 10, the adaptive antenna beam-forming for a link of the data transmission device 140 to the user device 120 in terms of adjustment in the positioning of the user device 120 and the beam-forming control performed over the position of the user device 120 by phase control of the beam-forming of the data transmission device 140 is improved, using computation resources (such as the user device 120) and network resources (such as the cloud server 130) extrinsic to the data transmission device 140, so as to lessen the workload of the data transmission device 140, enhance the efficiency of the data transmission device 140 in adjusting antenna beam-forming, render the adaptive antenna beam-forming of the data transmission device 140 more flexible, use the cloud server 130 to perform various optimization operations, and optimize the coverage rate for multiple users by weight matching and data construction of cloud computation.

The positioning devices 110 send a plurality of positioning signals to the at least a user device 120 to perform a positioning process. Referring to FIG. 1, the positioning devices 110 (provided in the number of three or more, for example) are placed indoors or outdoors, as indicated by the dashed line of FIG. 1. The positioning devices 110 emit positioning signals, such as broadcast signals or response signals. For instance, a positioning signal of one of the positioning devices 110 is received by the user device 120 to obtain the signal strength, so as to infer the distance between the user device 120 and the positioning device 110. Since the user device 120 receives the positioning signals of the positioning devices 110, it is feasible to locate the user device 120. For example, the positioning devices 110 are provided in the form of Bluetooth-enabled devices, such as beacons. The Bluetooth-enabled devices operate in accordance with any Bluetooth protocols, such as Bluetooth-enabled 1.0~Bluetooth-enabled 4, or Bluetooth-enabled 5, or by any related means, such as infrared or the other communication devices which support ZigBee protocol. The positioning devices 110 can also be provided in the form of any devices which support satellite positioning system, such as global positioning systems (GPS), Beidou navigation satellite positioning system, and the like.

The data transmission device 140 is for use in adaptive antenna beam-forming to provide wireless communication. Referring to FIG. 1, the user device 120 communicates with the cloud server 130 through the data transmission device 140. For example, the data transmission device 140 is placed indoors or outdoors to provide wireless broadband or mobile communication services, and is connected to a network 50 (such as FTNS, the Internet, a mobile network, and/or a combination thereof) by cable or wireless transmission so that the user device 120 can communicate with the cloud server 130. For instance, the data transmission device 140 is one of a wireless network access point, a wireless network router, a mobile communication base station, a wireless network, and a mobile communication base station, but the present invention is not limited thereto, as the data transmission device 140 can be provided in the form of any communication device which can be applied to adaptive antenna beam-forming to provide wireless communication.

The cloud server 130 receives positioning information SL of the at least a user device 120, generates a control signal SB for use in beam-forming in accordance with the positioning information SL, and sends the control signal SB to the data transmission device 140. The data transmission device 140 controls the beam-forming of the data transmission device 140 in accordance with the control signal SB.

Figure 2:
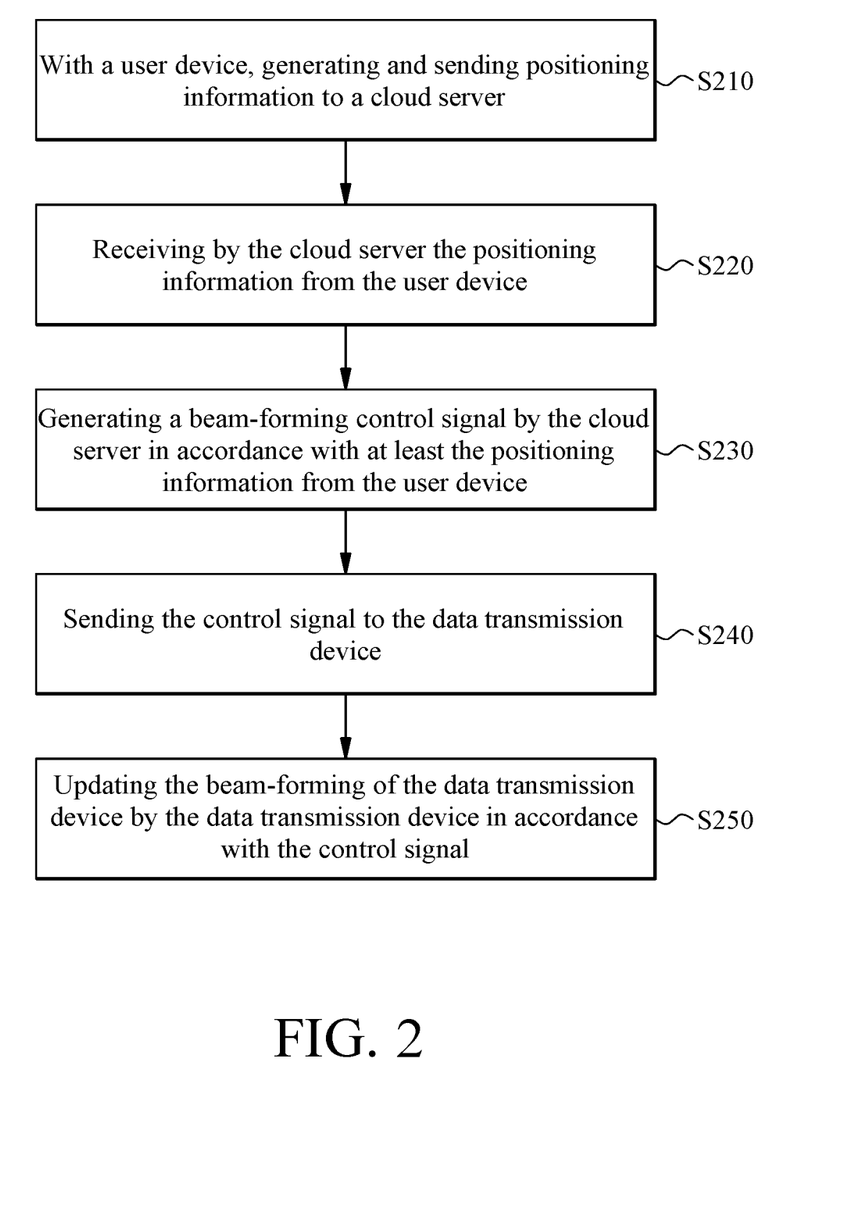
FIG. 2 is a flowchart of an adaptive antenna beam-forming method for a link of a data transmission device to at least a user device, associated with the smart communication system, according to an embodiment of the present invention.

FIG. 2 is a flowchart of an adaptive antenna beam-forming method for a link of the data transmission device 140 to at least a user device, associated with the smart communication system 10, according to an embodiment of the present invention.

Referring to FIG. 2, step S210 involves generating and sending positioning information SL to the cloud server 130, using the user device 120. For example, the user device 120 executes an application for receiving a plurality of positioning signals from the positioning devices 110 and thereby receiving the positioning signals. For instance, the positioning information SL of the user device 120 at least comprises: signal strength (such as Received Signal Strength Indicator, RSSI) of the positioning devices manifested thereby toward the user device 120 and recorded by the user device 120 after the user device 120 has received the positioning signals, and signal strength (for example, the received signal strength of a wireless broadband network) related to a wireless communication link and provided by the data transmission device 140 to the user device 120. The positioning information SL further comprises the other information, such as identity (ID) of the user device 120 and/or time, but the present invention is not limited thereto, as the present invention can also be implemented by the other means, for example, infrared or the other Internet communication protocols. In an embodiment, the positioning information is regarded as communication reception quality data and therefore can be defined in any other way, provided that the communication reception quality data is useful for calculating the relative position of the user device 120.

Step S220 involves receiving by the cloud server 130 the positioning information SL from the user device 120.

Step S230 involves generating a beam-forming a control signal SB for beam-forming by the cloud server 130 in accordance with the positioning information SL from the at least a user device 120. For instance, the cloud server 130 computes the relative position of the user device 120 in accordance with the positioning information SL of the at least a user device 120 and optimizes, with an algorithm, the control signal SB which suits the user device 120. Therefore, the user device 120 will obtain the optimal signal strength, provided that the data transmission device 140 controls the beam-forming of the data transmission device 140 in accordance with the control signal SB.

Step S240 involves sending the control signal to the data transmission device 140.

Step S250 involves updating the beam-forming of the data transmission device 140 by the data transmission device 140 in accordance with the control signal.

With the method, not only is the adaptive antenna beam-forming of the data transmission device rendered more flexible, but various optimization operations can also be performed with the cloud server. For example, the coverage rate for multiple users can be further optimized by weight matching and data construction of cloud computation. In an embodiment, the method can be carried out repeatedly or at time intervals, or carried out again according to the extent of a position variation, so that the cloud server displays optimal performance because of the continuous update of intrinsic data pertaining to the positioning information.

In an embodiment of step S230, the cloud server 130 is configured to compute the relative position of the user device 120 in accordance with the positioning information SL of the at least a user device 120 by, for example, the least squares method or any other positioning algorithm. In this embodiment, since the relative position of the user device 120 is known, the cloud server 130 is configured to compute, in accordance with the relative position, the spatial matching of a main beam of an array antenna (also known as smart antenna) of the data transmission device 140, so as to generate the control signal SB and thereby instruct antenna units in the array antenna of the data transmission device 140 to generate the beam which suits the user device 120 (or multiple user devices) most in accordance with the control signal SB.

In practice, power parameters and/or phases of the antenna units oriented in the directions which the optimal array antenna may be oriented can be computed by a predetermined beam-forming algorithm, such as a particle swarm algorithm, a differential algorithm, a dynamic variation algorithm, a pseudo electromagnetic algorithm, or a gene algorithm, and in conjunction with an optimization algorithm, and then stored, in the form of a table, in the data transmission device 140. With the method of FIG. 2, in step S230, the cloud server 130 generates the control signal SB inclusive of a control code. The control code instructs the data transmission device 140 to look up a table to obtain phases and/or power parameters for controlling the antenna units, so as to form the required beam. However, the implementation of the present invention is not limited thereto. For example, in another embodiment, the method further comprises a step of generating a beam table, and the step is executed by the cloud server 130. The beam table is stored in the cloud server 130 so that it can be looked up as needed, or is sent to the data transmission device 140 for storage and subsequent lookup.

In yet another embodiment, the cloud server 130 is provided in accordance with step S230 to execute the optimization computation of the power parameters and/or phases of the antenna units of the data transmission device 140 and generate the control signal SB inclusive of the phases and/or power parameters so that, in step S250, the data transmission device 140 forms the required beam in accordance with the control signal SB.

Figure 3A:
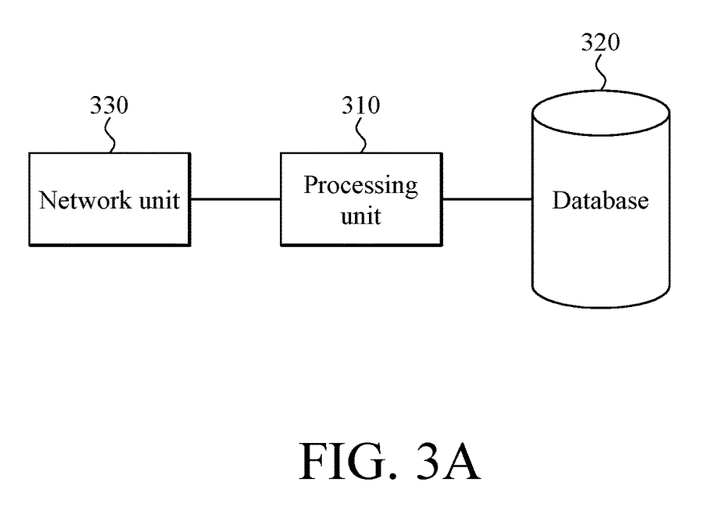
FIG. 3A is a block diagram of a cloud server in FIG. 1 according to an embodiment of the present invention.

FIG. 3A is a block diagram of a cloud server in FIG. 1 according to an embodiment of the present invention. Referring to FIG. 3A, the cloud server comprises a processing unit 310 and a database 320. The cloud server carries out any one of the foresaid embodiments of the method of FIG. 2. The database 320 is coupled to the processing unit 310 (for example, by a proximate connection or a remote connection). The processing unit 310 receives and sends the positioning information SL of at least a user device to the database 320. The processing unit 310 determines the position of the at least a user device 120 relative to the positioning devices 110 or the data transmission device 140 according to the positioning information SL of the at least a user device 120, so as to generate the control signal SB for beam-forming. The cloud server further comprises a network unit 330 coupled to the processing unit 310 and adapted for use in network communication.

Figure 3B:
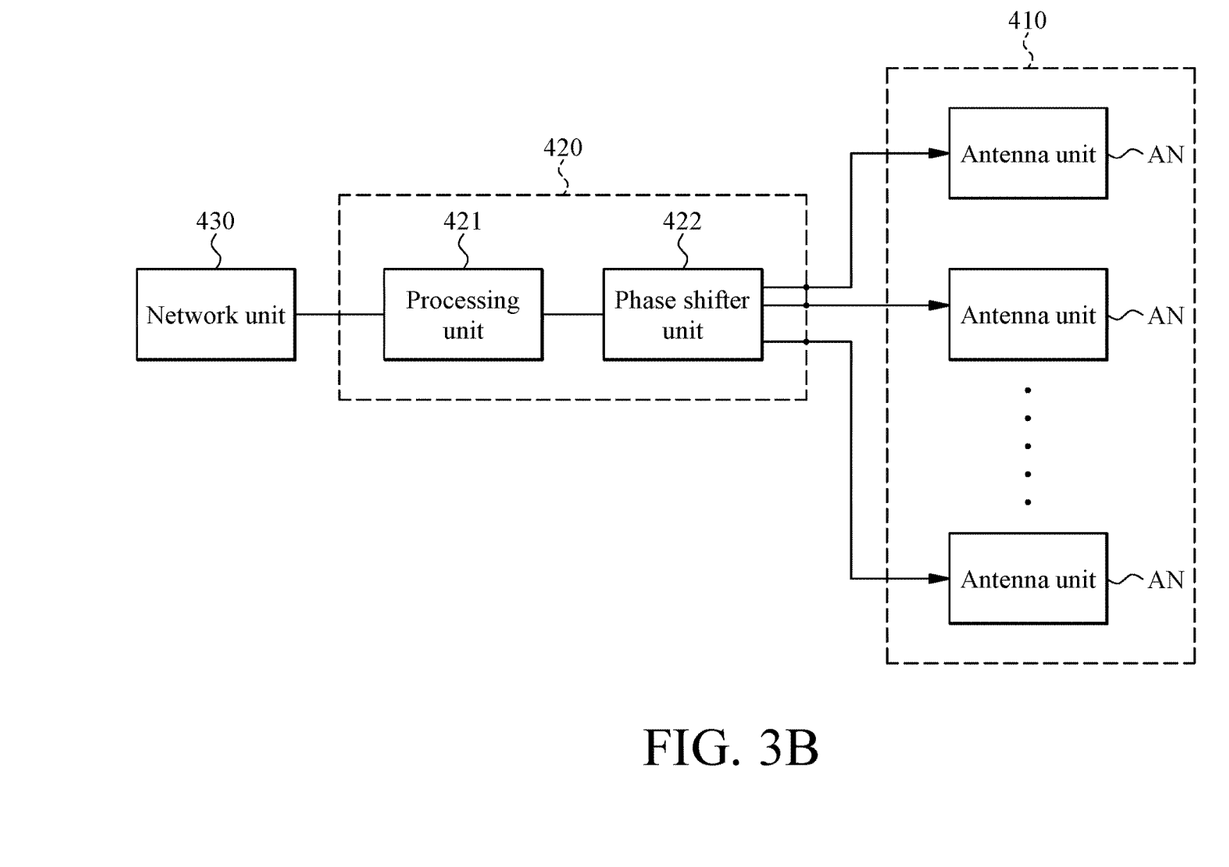
FIG. 3B is a block diagram of a data transmission device in FIG. 1 according to an embodiment of the present invention.

FIG. 3B is a block diagram of a data transmission device in FIG. 1 according to an embodiment of the present invention. Referring to FIG. 3B, the data transmission device comprises an array antenna 410 and a control circuit 420. The data transmission device carries out any one of the aforesaid embodiments of the method of FIG. 2. The array antenna 410 comprises a plurality of antenna units AN. The control circuit 420 is coupled to the antenna units AN to control the array antenna 410 to adaptively form an antenna beam. The control circuit 420 controls the array antenna 410 to adaptively form an antenna beam in accordance with the control signal SB. In an embodiment of the present invention, the control circuit 420 comprises a phase shifter unit 422 which has a plurality of phase shifters and is coupled to the antenna units AN to control the antenna units AN to adaptively form an antenna beam. For example, the phase shifters are active phase shifters which are supplied with voltage and current to control the output phase of the phase shifters, thereby outputting the required phase in accordance with the beam-forming requirement. The phase shifters can also be effectuated digitally in accordance with an input digital signal (such as a 4-bit or 5-bit digital signal) in order to output the required phase. The control circuit 420 further uses the other radio frequency components, such as radio frequency amplifiers, to meet the requirements of antenna beam-forming, but the present invention is not limited thereto.

The control circuit 420 comprises a processing unit 421 for controlling the phase shifter unit 422 to output radio frequency signals in accordance with the control signal SB, thereby effectuating beam-forming. The processing unit 421 is provided in the form of a processor, a digital signal processor, a programmable integrated circuit, such as a microcontroller, a field programmable gate array (FPGA) or an application specific integrated circuit (ASIC), or a dedicated circuit or module.

In an embodiment, the processing unit 421 operates in conjunction with a built-in or external memory unit. The memory unit stores one or more beam tables pertaining to beam-forming, such as tables of control parameters corresponding to different directions indicated by the main beam of the array antenna 410. In this embodiment, the processing unit 421 is configured or programmed to read, by looking up a table, from the beam table the control parameters, for example, at least phase parameters and/or power parameters of the antenna units AN, corresponding to a specific direction indicated by the main beam of the array antenna 410 in accordance with the control signal SB. Afterward, the processing unit 421 controls the phase shifter unit 422 or any other possible radio frequency components (such as power amplifiers) to form the required beam in accordance with the parameters. In this embodiment, the control signal SB is configured to include commands or codes (for example, codes which denote angles by which the main beam shifts) obtained by looking up the beam table, so as for the control circuit 420 to look up the beam table and find the phases and/or power parameters of the antenna units AN which are required by the main beam to shift by the angles, but the present invention is not limited thereto.

For instance, the data transmission device 140 is provided in the form of a wireless network access point, a wireless network router, a mobile communication base station, a wireless network, or a mobile communication base station, but the present invention is not limited thereto, as the data transmission device 140 can also be provided in the form of any communication device for use in adaptive antenna beam-forming to provide wireless communication. In an embodiment, the data transmission device 140 further comprises a network unit 430 coupled to the control circuit to communicate with the cloud server and thereby receive the control signal. In another embodiment, the network unit 430 is integrated into the control circuit 420. In some embodiments, the data transmission device 140 provides at least one of wireless local area network communication, wireless mobile network communication, and wireless wide area network communication.

The present invention is not restricted to the embodiment of the user device 120. For example, the user device 120 comprises a processing unit, a network unit, a display unit, and a memory. The processing unit controls the network unit, the display unit, and the memory to effectuate various forms of computation and communication, and is exemplified by a smart cell phone, a tablet, a worn device, or a notebook computer. The user device 120 executes Android, iOS or Windows Phone or any operating system for a personal computer.

The smart communication system for adaptive antenna beam-forming for a link of a data transmission device to at least a user device according to an embodiment of the present invention is described below. In this embodiment, with reference to the framework illustrated by FIG. 1, at least three positioning devices (such as Bluetooth-enabled positioners B1, B2, B3) and three data transmission devices (such as Wi-Fi access points X, Y, Z) are placed indoors. For the sake of surveillance, a monitoring interface and the other interfaces are disposed on the cloud server to observe the effect of updating the beam-forming. FIG. 4A -FIG. 4D are schematic views of interfaces for the smart communication system according to an embodiment of the present invention.

Figure 4A:
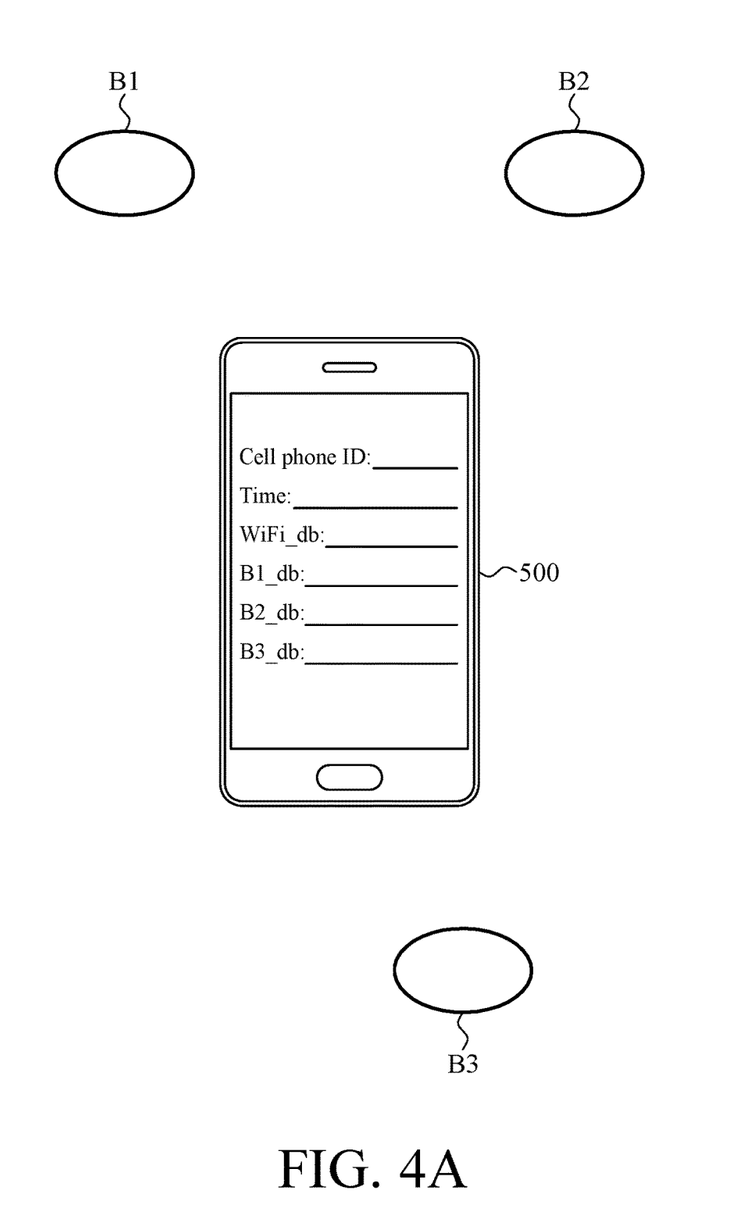
FIG. 4A~FIG. 4F are schematic views of interfaces for the smart communication system according to an embodiment of the present invention.

Referring to FIG. 4A, it is a schematic view of a user device 500 which is the client end of a handheld device, such as a cell phone or a tablet. As shown in FIG. 4A, after a cell phone application has started, the user device 500 begins to search for neighboring positioners, gets connected to the cloud server via the wireless network provided by the data transmission device, uses the cell phone application-related information, such as cell phone identity (ID), time, WiFi signal strength, and RSSI signal strength of Bluetooth-enabled positioners, as the positioning information of the cell phone, and uploads the information to the cloud server at a configured time, so as to display the information on a cell phone interface.

In this embodiment, three Bluetooth-enabled positioning devices B1, B2, B3 are detected, and the cell phone application displays the information on the cell phone interface. The information comprises: signal strength wifi_db (such as −50dB) of the data transmission device toward the cell phone, signal strength B1_db (such as −60dB) of positioner B1, signal strength B2_db (such as −70dB) of positioner B2, and signal strength B3_db (such as −75dB) of positioner B3, but the present invention is not limited thereto. In practice, for example, a program installed on the user device to collect the information can be executed on the background, and the program is configured to send the information to the cloud server, wherein, optionally, the information is not necessarily displayed on the interface for the user device.

Figure 4B:
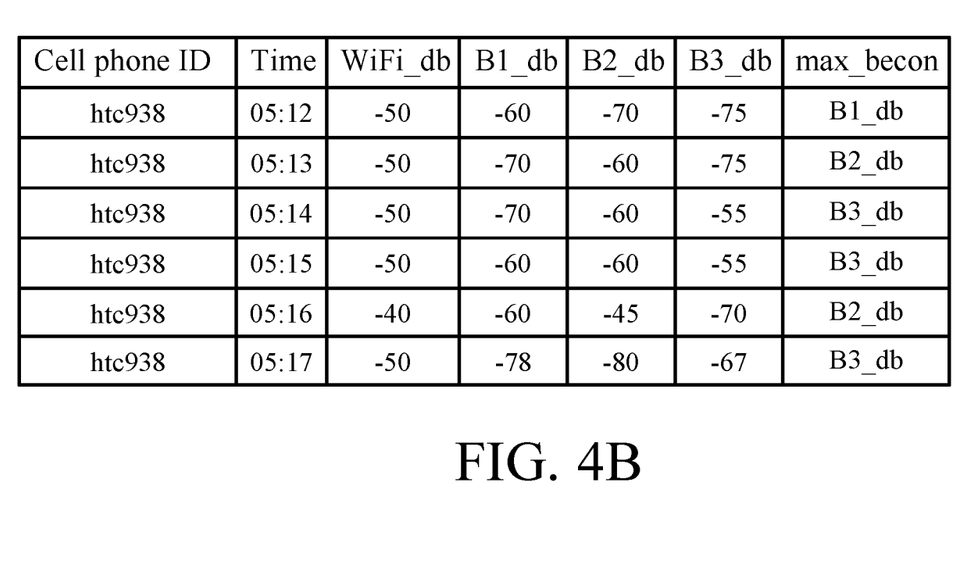

FIG. 4B is a schematic view of an interface for a database on the host-side of a cloud server. Referring to FIG. 4B, after the cloud server has received the positioning information of the cell phone, the cloud server calculates the max_beacon of the Received Signal Strength Indicator (RSSI) recorded on the cell phone and stores it in the database. The cloud server searches the database for the relative position of the cell phone and performs optimization computation to obtain spatial matching of the main beam of a matched antenna, generate the control signal of beam-forming of the data transmission device in accordance with the position of the cell phone, and send the control signal to the data transmission device. Therefore, the data transmission device controls the beam-forming of the data transmission device in accordance with the control signal.

For instance, the relative position of the cell phone can be obtained in accordance with the positions of the positioners by, for example, the least squares method. Since the coordinate positions of the positioners are configured to be known, it is feasible to use the RSSI value of the cell phone toward the positioners to calculate the distance between the cell phone and each positioner and then figure out the coordinates of the relative position of the cell phone. In this embodiment, the cloud server handles the computation of the relative positions of cell phones.

In this embodiment, the cloud server selects the data transmission device closest to the cell phone in accordance with the largest RSSI value of the positioners and uses a beam-forming algorithm to identify a smart antenna of the data transmission device and shift its beam to the optimal position relative to the cell phone. For example, the cell phone is in the vicinity of a specific positioner. The cloud server executes a beam-forming algorithm and allocates radiation weight and beam-indicated directions in accordance with the positions of the positioners B1, B2, B3 and the positions of the data transmission devices X, Y, Z. Since construction positions of the positioners and the data transmission device are fixed, the beam-indicated directions relative to each other can be calculated according to the construction positions. Therefore, when it is confirmed that a cell phone is located at the position of a positioner, the array antenna of the nearest data transmission device can have its beam altered and shifted to the position in accordance with the position of the Bluetooth-enabled positioner constructed in advance. The wireless signal strength (such as WiFi signal strength) of the data transmission device has a minimum of −77db, for example, so that the wireless signal strength in this embodiment can be increased to the range of −50db~−40db.

In this embodiment, optimization computation is performed with a beam-forming algorithm in conjunction with a gene algorithm to create a beam table which is then stored in data transmission devices X, Y, Z. The cloud server generates the control signal SB inclusive of a control code. The control code instructs the data transmission device to obtain, by looking up a table, phases and/or power parameters for controlling the antenna units, so as to form a required beam. The beam table contains phases and/or power parameters of the antenna units oriented in directions which the array antenna may be oriented. In this embodiment, beam directions fall within a range from −40 degrees to +40 degrees, and all the degrees shown in the beam table correspond to phases and/or power parameters of the antenna units in the array antenna, respectively.

In this embodiment, data transmission devices X, Y, Z are arranged in a way shown in FIG. 3B. The processing unit of the data transmission device is a microcontroller and is burnt into the beam table in advance. The network unit of the data transmission device is a network apparatus (model number: NPort 5150, manufactured by Moxa) whereby network messages (such as messages pertaining to TCP/IP protocol) from the cloud server are converted into signals of serial communication protocols, such as RS-232, so that not only can the processing unit of the data transmission device communicate with the cloud server, but a back-end circuit (phase shifter unit) can also control the antenna unit to form a beam in accordance with the control code-containing control signal generated through the communication with the cloud server.

Figure 4C:
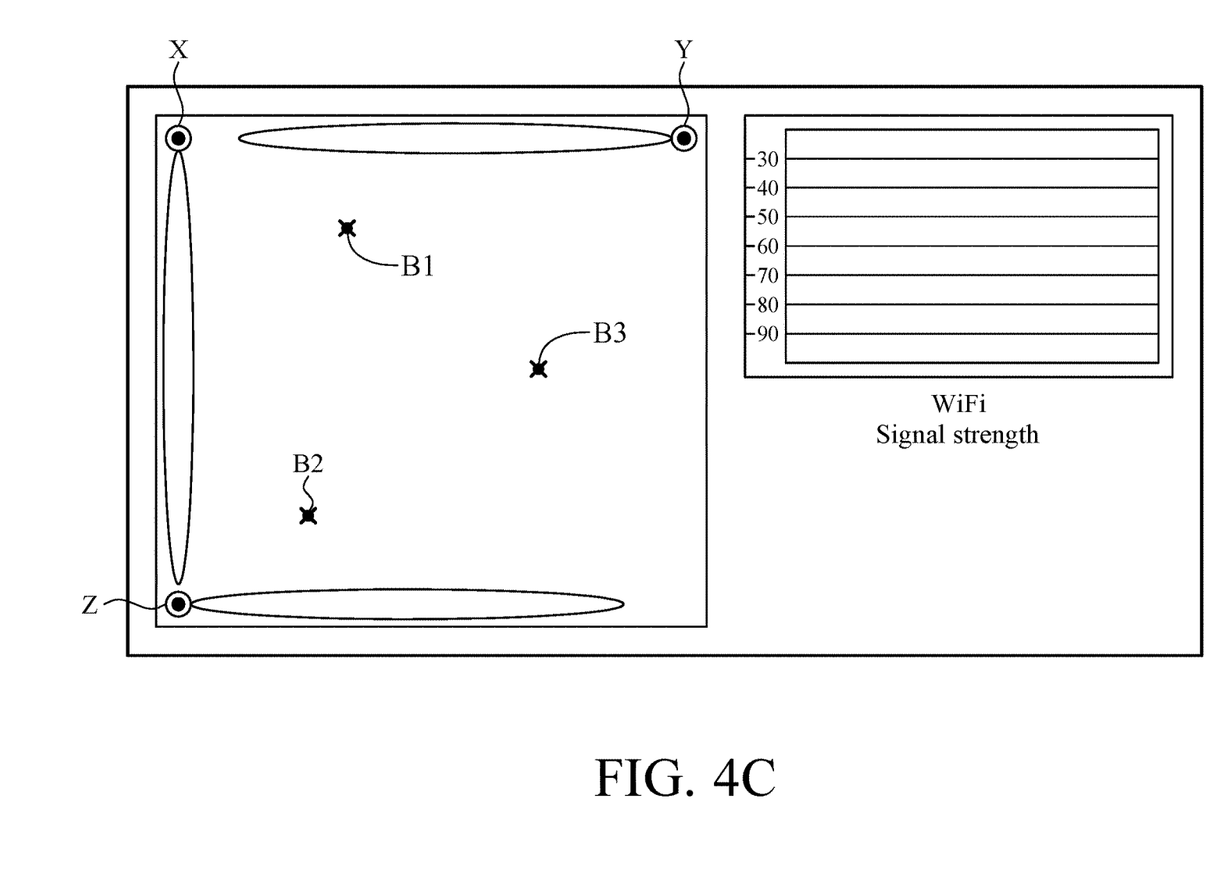
Figure 4D:
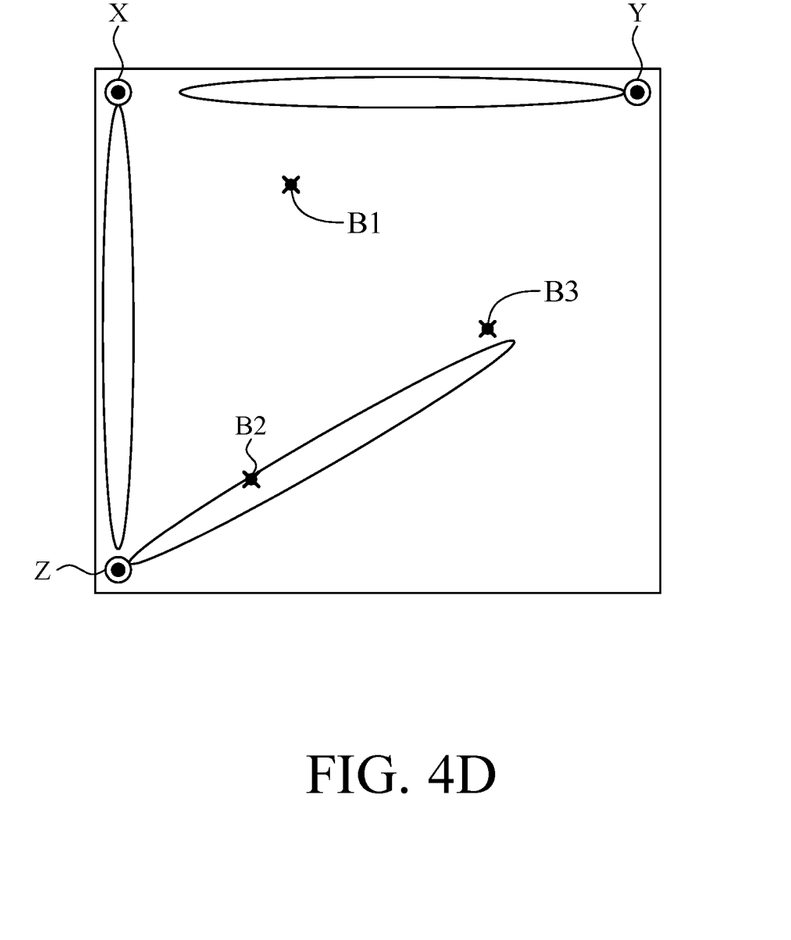
Figure 4E:
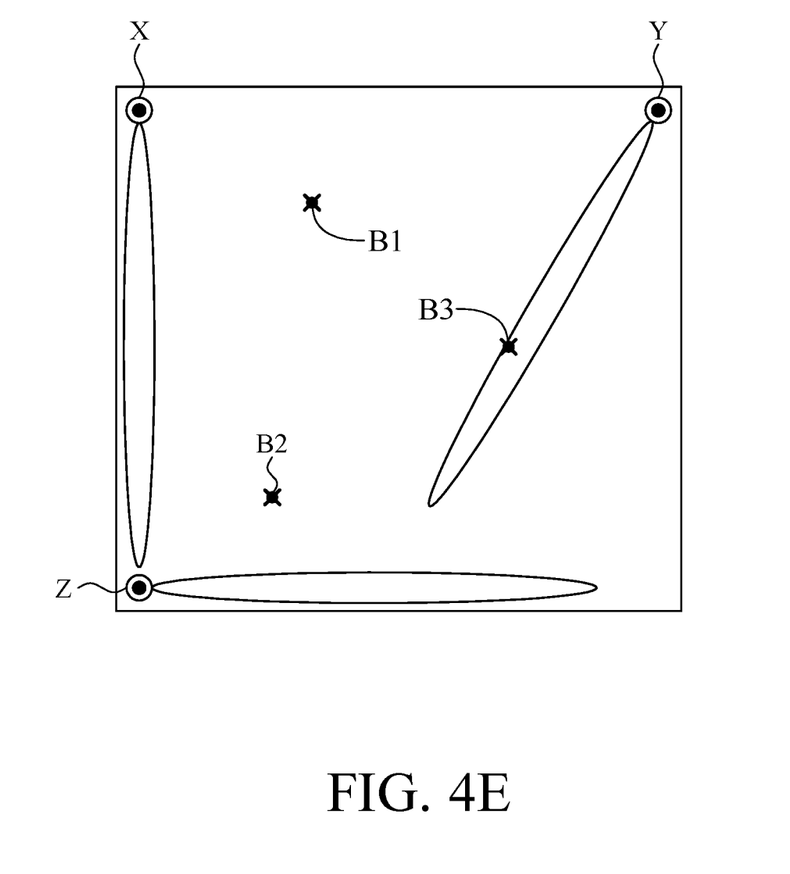
Figure 4F:
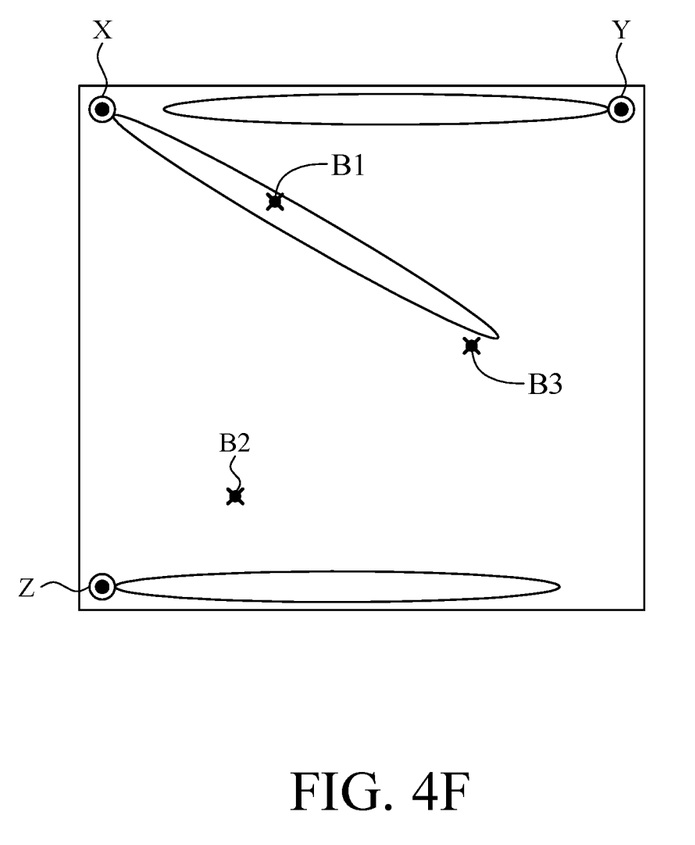

FIG. 4~FIG. 4F are schematic views of network surveillance interfaces for the smart communication system according to an embodiment of the present invention.

FIG. 4C shows an interface for a Website designed according to this embodiment. The interface displays the position of an antenna of a detection system relative to Bluetooth-enabled positioning devices and a graph of WiFi signal strength of signals uploaded by a cell phone to the cloud database against time, wherein data transmission devices X, Y, Z are denoted by circles, beam-indicated directions of three antennas are denoted by ellipses, positioners B1, B2, B3 are Bluetooth-enabled positioning devices constructed indoors to positioning the handheld device, WiFi signal strength is attributed to displaying WiFi signals of the handheld device, the vertical axis represents signal level (db), and the horizontal axis represents time.

Referring to FIG. 4D, if the handheld device moves to B2, the cell phone will upload the aforesaid information. After the cloud server has finished performing computation, the cloud server sends the control signal to data transmission device Z so that the beam shifts in the direction of the cell phone, taking less than 5 seconds in total. FIG. 4E and FIG. 4F illustrate the situations where the handheld device moves to B3 and B1, respectively, and the beam shifts of data transmission devices X, Y, respectively. The above-mentioned shows that this embodiment is effective in effectuating real-time signal optimization so that, after the cell phone application has been connected to the cloud server, the cell phone is configured to upload data persistently, whereas the network interface shown in FIG. 4C is also updated persistently, which indicates that data transmission devices X, Y, Z control the beam-forming, thereby allowing the data transmission devices to further optimize the quality of signals of cell phones.

Accordingly, the above embodiments of the present invention improve the adaptive antenna beam-forming for a link of a data transmission device to a user device in terms of adjustment in the positioning of the user device and the beam-forming control performed over the position of the user device, using computation resources and network resources extrinsic to the data transmission device, so as to lessen the workload of the data transmission device and thereby solve the problems arising from a "window period." The present invention further optimizes the coverage rate for multiple users by weight matching and data construction of cloud computation.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A smart communication system, for adaptive antenna beam-forming for a link to at least a user device, the system comprising:
  a plurality of positioning devices for sending a plurality of positioning signals to the at least a user device to effectuate positioning;
  a data transmission device for use with adaptive antenna beam-forming to provide wireless communication;
  a cloud server, wherein the user device communicates with the cloud server through the data transmission device, and the cloud server receives positioning information of the at least a user device, generates a control signal for beam-forming in accordance with the positioning information, and sends the control signal to the data transmission device, wherein the data transmission device controls the beam-forming of the data transmission device in accordance with the control signal;
  wherein the data transmission device comprises:
  an array antenna having a plurality of antenna units; and
  a control circuit coupled to the antenna units to control the array antenna to adaptively form an antenna beam, wherein the control circuit controls the array antenna to adaptively form an antenna beam in accordance with the control signal; wherein the control circuit comprises: a plurality of phase shifters coupled to the antenna units to control the antenna units to adaptively form an antenna beam.

2. The smart communication system of claim 1, wherein the data transmission device comprises:
   a network unit coupled to the control circuit to communicate with the cloud server and thereby receive the control signal.

3. The smart communication system of claim 1, wherein the cloud server comprises:
   a processing unit; and
   a database coupled to the processing unit,
   wherein the processing unit receives the positioning information of the at least a user device, sends the positioning information of the at least a user device to the database, and determines the position of the at least a user device relative to positions of the positioning devices in accordance with the positioning information of the at least a user device, thereby generating the control signal for beam-forming.

4. The smart communication system of claim 3, wherein the positioning information of the at least a user device at least comprises:
   signal strength of the positioning devices manifested thereby toward the user device and recorded by the user device after the user device has received the positioning signals, and signal strength related to a wireless communication link and provided by the data transmission device to the user device.

5. The smart communication system of claim 1, wherein the positioning devices comprise Bluetooth-enabled devices.

6. The smart communication system of claim 1, wherein the data transmission device provides at least one of wireless local area network communication, wireless mobile network communication, and wireless wide area network communication.

7. An adaptive antenna beam-forming method, the method comprising the steps of:
   with a user device, generating and sending positioning information to a cloud server;
   receiving by the cloud server the positioning information from the user device;
   generating a beam-forming control signal by the cloud server in accordance with the positioning information from the at least a user device;
   sending the control signal to a data transmission device; and
   controlling the beam-forming of the data transmission device in accordance with the control signal; wherein the data transmission device comprises:
   an array antenna having a plurality of antenna units; and
   a control circuit coupled to the antenna units to control the array antenna to adaptively form an antenna beam, wherein the control circuit controls the array antenna to adaptively form an antenna beam in accordance with the control signal; wherein the control circuit comprises: a plurality of phase shifters coupled to the antenna units to control the antenna units to adaptively form an antenna beam.

8. The method of claim 7, wherein positioning information of the user device at least comprises: signal strength of the positioning devices manifested thereby toward the user device and recorded by the user device after the user device has received the positioning signals, and signal strength related to a wireless communication link and provided by the data transmission device to the user device.

* * * * *